United States Patent [19]

Noller

[11] 3,903,743

[45] Sept. 9, 1975

[54] TEMPERATURE COMPENSATED THERMOMETER UTILIZING THERMOCOUPLES

[76] Inventor: Hans Gunter Noller, 201 Ellwood Dr., Raleigh, N.C. 27609

[22] Filed: Feb. 13, 1973

[21] Appl. No.: 332,107

[52] U.S. Cl. .................................. 73/361; 73/359
[51] Int. Cl.² .................................... G01K 7/12
[58] Field of Search .......................... 73/359, 361

[56] References Cited
UNITED STATES PATENTS

| | | | |
|---|---|---|---|
| 3,447,376 | 6/1969 | Turtora et al. | 73/359 |
| 3,534,809 | 10/1970 | Charitat et al. | 73/359 X |

*Primary Examiner*—Richard C. Queisser
*Assistant Examiner*—Frederick Shoon

[57] ABSTRACT

A temperature compensated thermometer, utilizing thermocouples, especially useful for clinical purposes. A thermocouple is placed in the oral or anal cavity of a patient. The differential d.c. output from the thermocouple and a reference thermocouple is chopped, amplified, rectified and displayed on a meter calibrated in degrees. A resistor, or thermistor, in intimate thermal contact with the reference thermocouple, is connected to the chopper circuit to alter the output therefrom, in an offsetting manner, if a change in the ambient temperature of the reference thermocouple tends to cause an unwanted change in the differential thermocouple output voltage.

4 Claims, 2 Drawing Figures

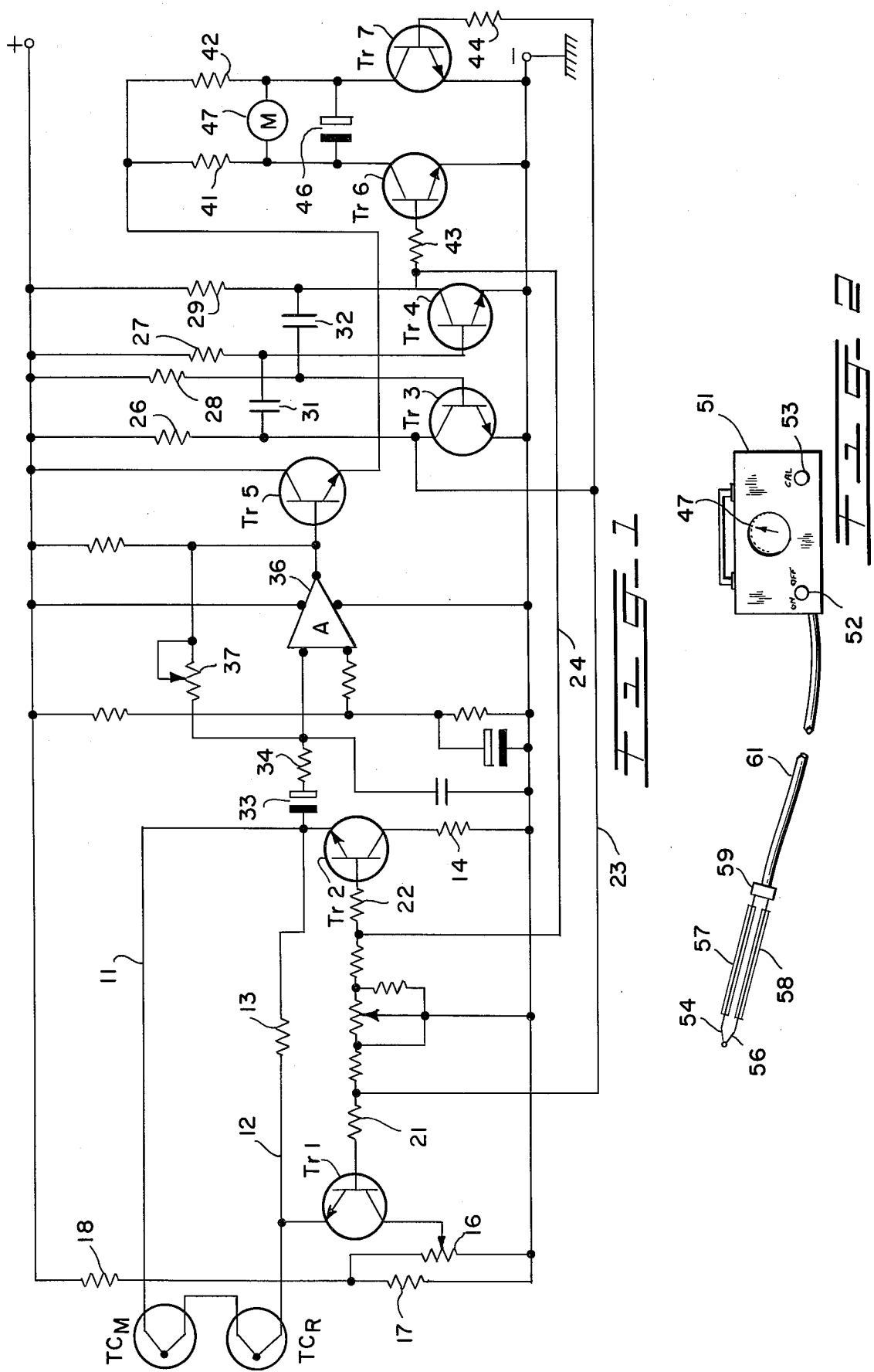

TEMPERATURE COMPENSATED THERMOMETER UTILIZING THERMOCOUPLES

BACKGROUND OF THE INVENTION

1. Field of the Invention

Broadly speaking, this invention relates to apparatus for measuring temperature. More particularly, in a preferred embodiment, this invention relates to a thermocouple temperature measuring device including means for compensating for changes in the ambient temperature of the reference thermocouple.

2. Discussion of the Prior Art

Measuring the temperature of the human body by conventional means, such as a mercury thermometer, has many disadvantages. For example, it is necessary to wait several minutes before an accurate reading can be taken. During this interval, the patient must be continuously watched to ensure that he does not intentionally or unintentionally influence the reading by simulation or dissimulation.

Mercury thermometers are relatively expensive and must be reused over and over again. Thus, it becomes necessary to sterilize the thermometer after each use and, of course, because a thermometer is heat sensitive, chemical rather than thermal sterilization must be employed. If this is carelessly or improperly done, the risk of cross infection between patients is great.

Mercury thermometers are manufactured from glass and if the glass breaks, for example, when taking the temperature of a child, an epileptic or an hysterical patient, the patient is subject to mechanical injury from the broken glass and chemical injury from mercury, which is toxic.

The problem, then, is the provision of a thermometer which gives rapid but accurate temperature readings, is unbreakable in normal use, and which need not be sterilized after each use.

Electronic temperature measuring devices utilizing thermistors have been proposed as a solution to this problem, but have not proved practical in use, as thermistors have wide resistance variations and are thus not interchangeable unless they are very expensive. The price of even the cheapest thermistor makes it impossible to use them as a disposable item. In clinical thermometers using thermistors, sterilization is avoided by using disposable, slip-on plastic sleeves which are placed over the thermistor, but these sleeves increase the time required to obtain a temperature reading and thus offer little improvement over mercury thermometers.

Thermocouple thermometers are known in laboratory environments but have heretofore not been used in a portable clinical thermometer because of the cost of the high gain amplifier required and the necessity of maintaining the reference thermocouple element in a bath of ice water, or the use of a highly stable voltage compensator, to compensate for variations in the ambient temperature.

These and other problems have been solved in the instant invention which in a first embodiment comprises a first thermocouple which is positioned, in use, proximate the object whose temperature is to be measured.

The apparatus also includes a second thermocouple, which is substantially identical to the first thermocouple, and which is serially connected to the first thermocouple but oppositely poled with respect thereto.

Means are connected to the thermocouples to chop the differential d.c. output voltage from the thermocouples and to amplify the chopped signal. Also provided are means to rectify the chopped and amplified signal as well as indicating means connected to the output of the rectifying means.

The invention, and its mode of operation, will be more fully understood from the following detailed description, when taken in conjunction with the drawings, in which:

DESCRIPTION OF THE DRAWINGS

FIG. 1 is a schematic drawing of an illustrative embodiment of the invention; and FIG. 2 is a partially schematic, partially diagrammatic drawing of an illustrative housing for the circuit shown in FIG. 1.

DETAILED DESCRIPTION OF THE INVENTION

Referring to the drawing, a temperature measuring thermocouple $TC_m$ is serially connected with an oppositely poled reference thermocouple $TC_r$ of similar characteristics. The differential output voltage from thermocouples $TC_m$ and $TC_r$ is connected, via leads 11 and 12, to a resistor 13, one end of which is connected to the emitter of a transistor $Tr_1$ and the other end of which is connected to the emitter of a transistor $Tr_2$. The collector of transistor $Tr_2$ is connected to ground, via a fixed resistor 14, while the collector of transistor $Tr_1$ is connected to the sliding arm of a variable resistor 16 which is connected in parallel with a temperature compensating resistor 17. Advantageously, resistor 17 is in intimate thermal contact with the reference thermocouple $TC_r$. Resistor 17 is serially connected with a fixed resistor 18 between a source of positive potential (not shown) and ground.

Transistors $Tr_1$ and $Tr_2$ act as a conventional chopper circuit to chop the differential d.c. signal generated by the measuring and reference thermocouples $TC_m$ and $TC_r$, respectively. Gating signals to alternately switch transistors $Tr_1$ and $Tr_2$ "on" and "off" are fed to the respective bases thereof, via resistors 21 and 22, and leads 23 and 24. Leads 23 and 24, in turn, are connected to respective collector circuits of a pair of transistors $Tr_3$ and $Tr_4$, connected in a conventional astable multivibrator configuration. The frequency of oscillation of transistors $Tr_3$ and $Tr_4$ is determined by the value of resistors 26, 27, 28, 29 and capacitors 31 and 32, and may advantageously be set at about 1 kHz.

As is well known, the output from a typical thermocouple element is low, for example, less than $50\mu V/°C$, accordingly, the chopped d.c. signal from thermocouple elements $TC_m$ and $TC_r$ is fed, via a capacitor 33 and a resistor 34, to the input of a high gain operational amplifier 36, for example, a Siemens type TAA 861. The output of operational amplifier 36 is connected, via a variable resistor 37, to the input thereof as a negative feedback signal to control the gain. The output of amplifier 36 is also fed to the base of a transistor $Tr_5$, which functions as an emitter follower.

The emitter of transistor $Tr_5$ is connected, via a pair of resistors 41 and 42, to the collectors of a pair of transistor rectifiers $Tr_6$ and $Tr_7$, respectively. The base of transistor $Tr_6$ is connected, via a resistor 43, to the collector of transistor $Tr_4$ and the base of transistor $Tr_7$ is similarly connected to the collector of transistor $Tr_3$, via a resistor 44. A capacitor 46 and a meter 47 are connected in parallel across the collectors of transistors $Tr_6$ and $Tr_7$. Thus, transistors $Tr_6$ and $Tr_7$ are also alternately gated into conduction at the multivibrator rate.

In operation, thermocouple $TC_m$ is placed in contact with the object whose temperature is to be measured. For use in a medical environment, for example, the thermocouple would be inserted into the rectum of the patient or placed in the patient's cheek pocket, depending upon the circumstances. In a preferred embodiment, all circuitry, including a suitable power source, for example, a 12 volt cell regulated by a regulating circuit (not shown), is contained within a case, except for thermocouple $TC_m$, which is connected thereto by a cable having a receptacle at the free end thereof.

As the temperature of thermocouple $TC_m$ rises above that of reference thermocouple element $TC_r$, a differential voltage is developed, which voltage is chopped into an alternating square wave signal by transistors $Tr_1$ and $Tr_2$, the frequency of the square wave being determined by the frequency of the multivibrator comprised of transistors $Tr_3$ and $Tr_4$. The chopped signal is then amplified by operational amplifier 36 and rectified by transistors $Tr_6$ and $Tr_3$ which are also coupled to the multivibrator. The differential voltage appearing on the collectors of transistors $Tr_6$ and $Tr_7$ is detected by meter 47 which may be directly calibrated in degrees, if desired. Capacitor 46 acts to smooth the rectified signal and also eliminates the 1 kHz tone from the multivibrator which might be objectional to a patient under stress.

If the ambient temperature changes, the differential output voltage from thermocouples $TC_m$ and $TC_r$ will change and, if this is not corrected, the temperature reading on meter 47 would be erroneous. However, it will be recalled that resistor 17 is in intimate thermal contact with thermocouple $TC_r$, thus, the temperature of resistor 17 will track the temperature of the reference thermocouple very closely. In a preferred embodiment, resistor 17 is selected to have a positive temperature coefficient. Thus, as the ambient temperature rises, the differential output from the thermocouple drops, however, the voltage developed across resistor 17 will rise and the fraction of that voltage which is sensed by variable resistor 16 is fed to the collector circuit of transistor $Tr_1$, thereby altering, in an offsetting manner, the output of transistor $Tr_1$, hence altering the amplitude of the signal applied to the input of operational amplifier 36. The net effect is to make the operation of the circuit essentially independent of the ambient temperature, without the necessity of immersing the reference thermocouple, for example, in a bath of melting ice water. Resistor 16 need be adjusted only once, when the device is initially calibrated at the factory, and will not need readjustment unless some circuit component is replaced.

A thermistor may also be employed for temperature compensation, rather than resistor 17, but because a thermistor has a negative temperature coefficient, it must be associated with transistor $Tr_2$ rather than $Tr_1$. Typically, resistor 17 will comprise a length of ordinary copper wire of about 10 ohms resistance and resistor 16 a 100 ohm potentiometer. Resistor 16 may be omitted if the length, and hence the resistance, of resistor 17 is adjusted to the optimum value during calibration. The sensing thermocouple advantageously comprises a pair of dissimilar wires spot welded at one end and contained in insulating jackets. The wires may have their free ends formed into contacts for insertion into the receptacle connected to the instrument cord. The sensing thermocouple may, thus, be manufactured very inexpensively, for example, for less than one cent each, and they, thus, may be discarded after each use making it unnecessary to sterilize the instrument between patients.

FIG. 2 illustrates one practical embodiment of the invention. As shown, the entire circuitry of FIG. 1, less thermocouple $TC_m$, and including a suitable regulated power supply (not shown), is contained within a hand-held case 51. The case includes meter 47, advantageously directly calibrated in degrees Fahrenheit or Centigrade (or both), an on-off switch 52 connected to the power supply, and a calibrating knob 53 to zero the meter reading. Thermocouple $TC_m$, comprising a first wire 54, and a second wire 56, respectively, insulated by jackets 57 and 58 is connected to a female receptacle 59 which is connected to the free end of a flexible cable 61 which connects to case 51 and hence to thermocouple $TC_r$ and transistor $Tr_2$.

The invention has been disclosed with reference to the measurement of the temperature of a human patient. Obviously, it could equally well be used to measure the temperature of an animal such as a dog or cat, or for that matter, the temperature of an inanimate object such as a furnace, chemical solution, etc., etc.

One skilled in the art can make various substitutions and changes to the circuit shown, without departing from the spirit and scope of the invention.

What is claimed is:

1. Apparatus for measuring the temperature of an object, which comprises:
   a first thermocouple, said thermocouple being positioned, in use, proximate the object whose temperature is to be measured;
   a second thermocouple, substantially identical to said first thermocouple, serially connected with said first thermocouple but oppositely poled with respect thereto;
   a multivibrator operating at a predetermined, fixed frequency;
   first and second transistors, the emitters thereof being respectively connected to said first and second thermocouples and the bases thereof being respectively connected to oppositely phased outputs of said multivibrator for chopping the differential d.c. output voltage developed by said first and second thermocouples;
   means, connected to said chopping means, for amplifying said chopped d.c. output voltage;
   means, connected to said amplifying means, for rectifying said chopped d.c. output voltage;
   indicating means, connected to said rectifying means, for indicating the temperature of said object, the value indicated by said indicating means being proportional to the differential d.c. output voltage of said first and second thermocouples;
   a temperature compensating resistor in substantially intimate thermal contact with said second thermocouple;
   means for supplying a d.c. current to said resistor thereby to generate a voltage proportional to the instantaneous resistance thereof; and
   means for supplying said voltage to said first and second transistors to alter the magnitude of the output signal therefrom, in an offsetting manner, if a change in the ambient temperature of said second thermocouple alters the differential d.c. output voltage from said first and second thermocouples.

2. The apparatus according to claim 1 wherein said temperature compensating resistor is associated with the collector circuit of said first transistor.

3. The apparatus according to claim 1 wherein said temperature compensating resistor is associated with the collector circuit of said second transistor.

4. The apparatus according to claim 1 wherein said rectifying means comprises:

third and fourth transistors, in common emitter configuration, each of said transistors having a resistor in the collector circuit thereof, one end of both of said resistors being connected to said emitter follower; and means connecting the bases of said third and fourth transistors to respectively oppositely phased outputs of said multivibrator, and said indicating means is connected between respective junctures of the collectors of said third and fourth transistors and the other ends of said resistors.

* * * * *